Sept. 26, 1939.   R. H. PENNEBAKER   2,173,978
OIL FILTERING MEDIUM AND METHOD OF PREPARING THE SAME
Filed Sept. 26, 1936   3 Sheets-Sheet 1
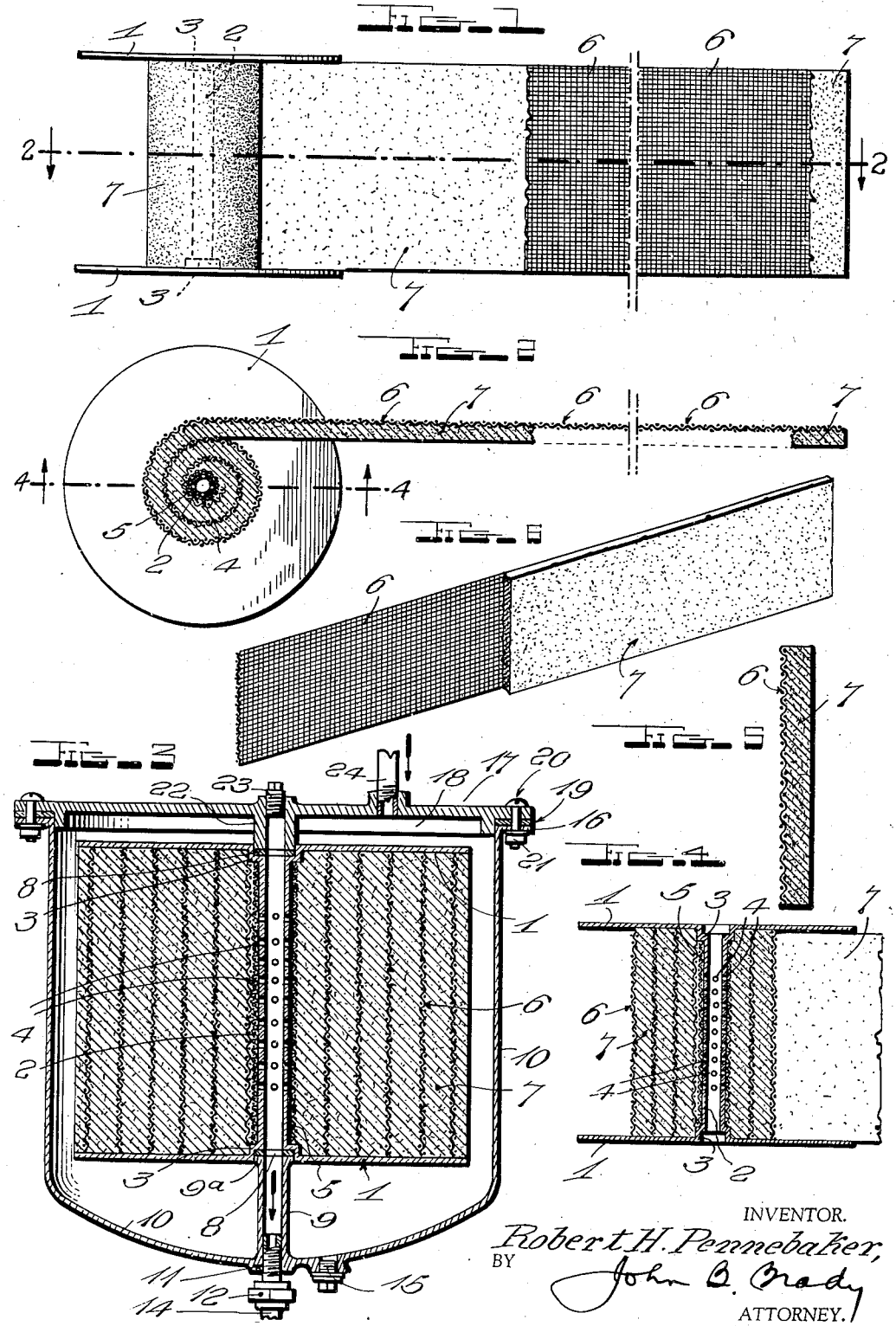
INVENTOR.
Robert H. Pennebaker,
BY John B. Brady
ATTORNEY.

Sept. 26, 1939.   R. H. PENNEBAKER   2,173,978
OIL FILTERING MEDIUM AND METHOD OF PREPARING THE SAME
Filed Sept. 26, 1936   3 Sheets-Sheet 2
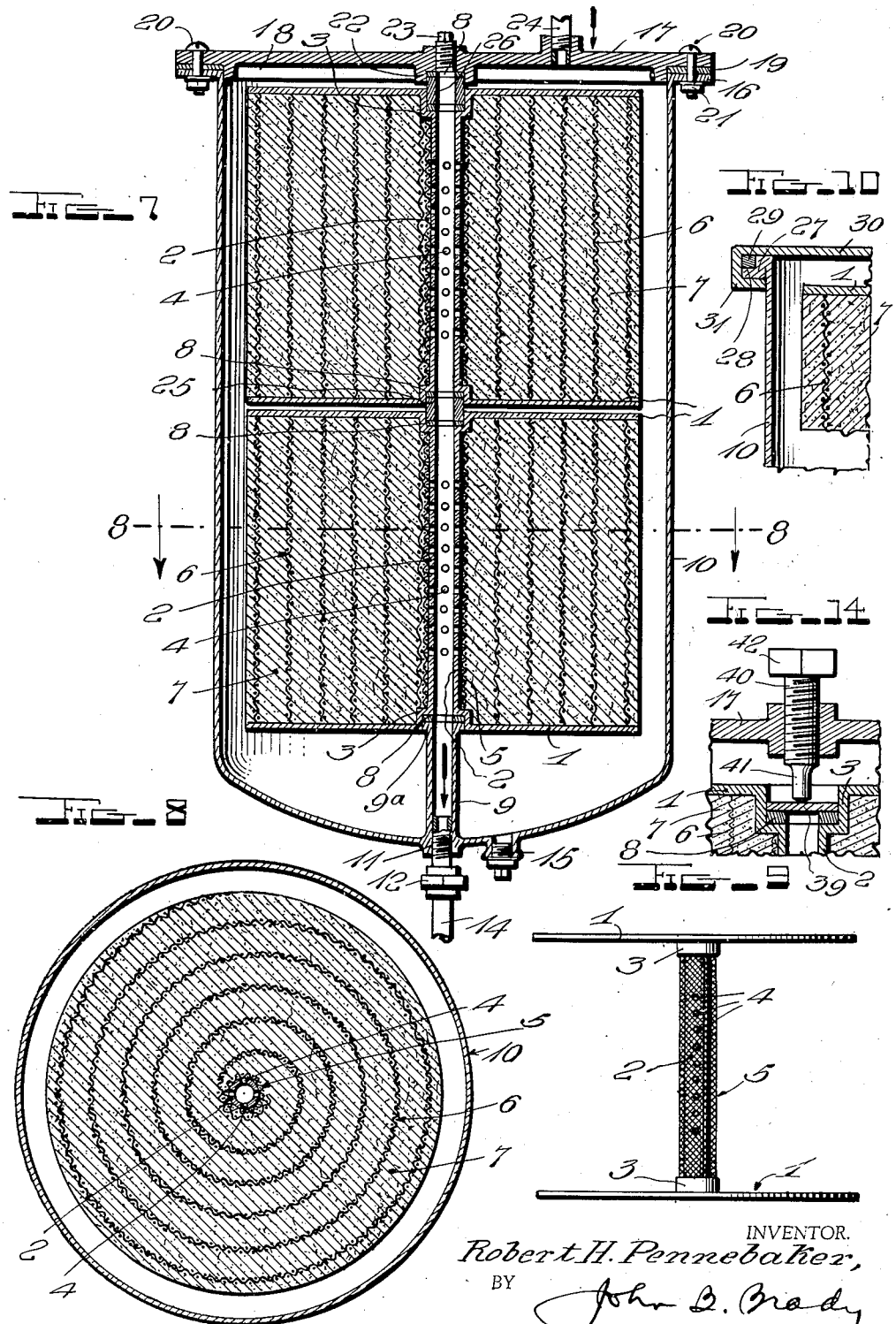

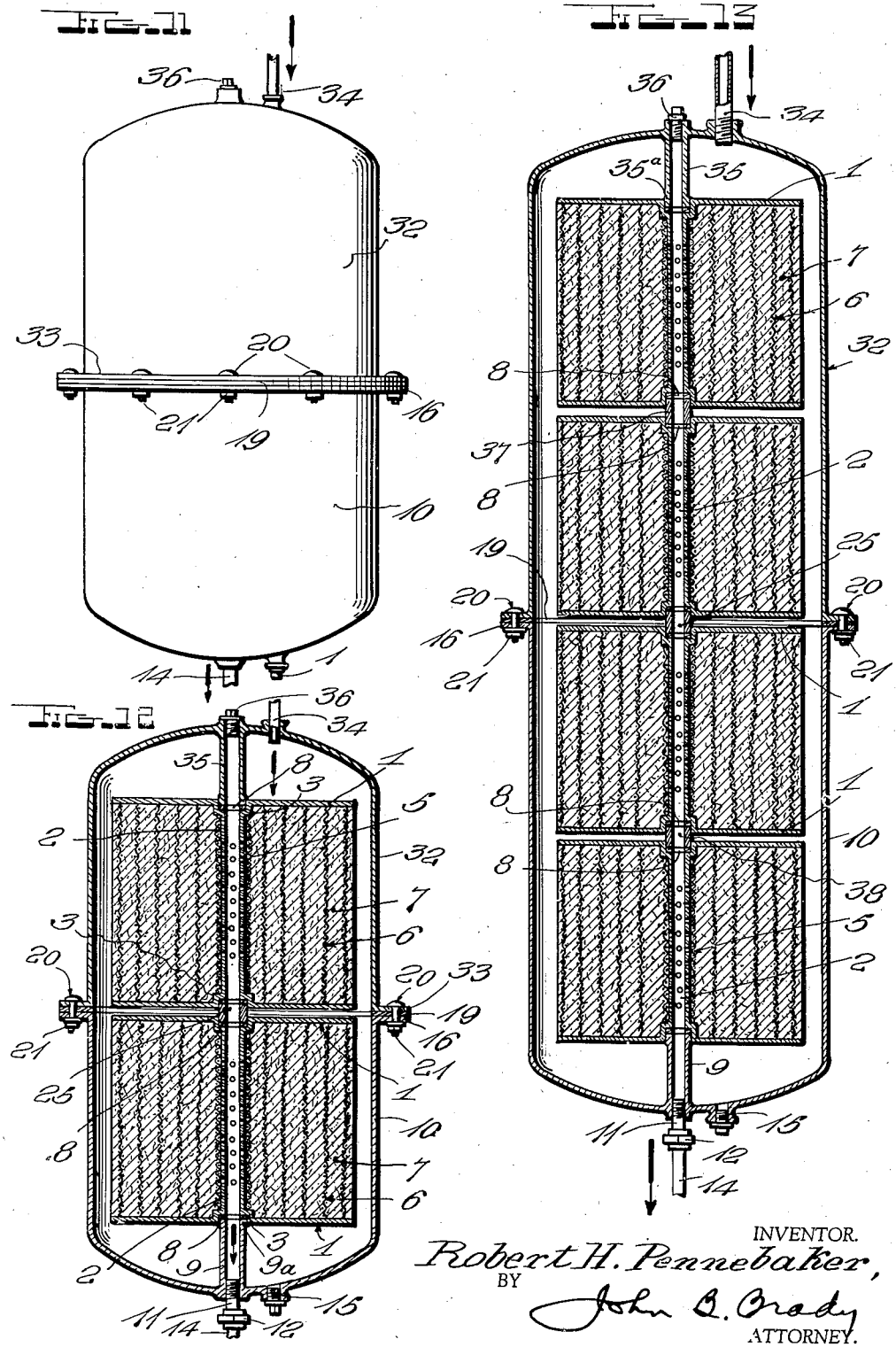

Patented Sept. 26, 1939

2,173,978

UNITED STATES PATENT OFFICE 2,173,978

OIL FILTERING MEDIUM AND METHOD OF PREPARING THE SAME

Robert H. Pennebaker, Memphis, Tenn.

Application September 26, 1936, Serial No. 102,762

6 Claims. (Cl. 210—183)

My invention relates broadly to an oil filtering medium and method of preparing the same and more particularly to an improved process of preparing and utilizing an oil filtering medium.

One of the objects of my invention is to provide a method of preparing an oil filtering medium and means for effectively utilizing such oil filtering medium.

Another object of my invention is to provide a process of preparing a filtering medium by which the filtering medium maintains its efficiency over long periods of time and is not subject to detrimental effects generally arising from free moisture.

Still another object of my invention is to provide an improved method of preparing a filtering medium by which detrimental effects of free moisture may be eliminated.

A further object of my invention is to provide a method of preparing fibrous materials for use in filtering systems by which the deliquescent properties of fibrous materials are reduced and the efficiency of such fibrous materials as a filtering medium greatly increased by rendering such filtering medium substantially immune from conditions of humidity and free moisture.

A still further object of my invention is to provide a construction of oil filtering in which the number of oil filter units constructed in accordance with my invention, may be accommodated within casings adapted to filtration problems of various kinds.

Another object of my invention is to provide a construction of oil filter in which an oil filtering medium may be wrapped in a coiled layer on replaceable spool units interposed in the path of oil to be filtered.

Other and further objects of my invention reside in the construction of spirally wrapped replaceable filter units for oil filters as set forth more fully in the specification hereinafter following by reference to the accompanying drawings in which:

Figure 1 is a plan view of the replaceable filter unit showing the method of assembly of the filtering medium with respect to the spool which carries the filtering medium; Fig. 2 is a horizontal sectional view taken on line 2—2 of Fig. 1; Fig. 3 is a central vertical longitudinal sectional view taken through a filter constructed in accordance with my invention and particularly adapted for association with the lubrication system of internal combustion engines on automobiles; Fig. 4 is a fragmentary sectional view of the filtering unit taken on line 4—4 of Fig. 2; Fig. 5 is a sectional view on an enlarged scale showing the filtering medium and the arrangement of the screen for supporting the filtering medium; Fig. 6 is a detailed perspective view of a layer of the filtering medium and illustrating the support thereof by a screen like strip member; Fig. 7 is a central vertical longitudinal sectional view showing a filter constructed in accordance with my invention and adapted more particularly for industrial application; Fig. 8 is a horizontal sectional view taken on line 8—8 of Fig. 7; Fig. 9 is a detailed side elevational view showing one of the spools upon which the screening member which supports the filtering medium is wound; Fig. 10 is a fragmentary sectional view of a modified form of filter embodying my invention in which the closure for the outer casing is permanently united with the casing in instances where extreme economy in manufacture must prevail and in which the replacement of the filter units is not essential; Fig. 11 is a side elevational view of a larger form of filter constructed in accordance with my invention; Fig. 12 is a vertical longitudinal sectional view of the filter illustrated in Fig. 11; Fig. 13 shows still another modified form of industrial type filter embodying my invention; and Fig. 14 illustrates one method which I employ in maintaining the filter units in assembled relation within the casing with the oil passages in the filter units maintained in alignment.

My invention is directed to a process of preparing a filtering medium and apparatus for efficiently employing the filtering medium thus prepared. I employ a fibrous material such as mineral or rock wool, silk, cotton, asbestos fibre and the like, and prepare this material for use as a filtering medium either alone or in combination with a filtering clay. It is necessary to, first, dehydrate the fibrous material by subjecting the material to a temperature high enough to drive off the free moisture contained therein. It is impossible to keep such material from taking on a percentage of free moisture from the very moment the materials are manufactured until they are put into use. The percentage of free moisture such materials absorb is determined entirely by climatic conditions to which the materials are subjected. This is true regardless of how the materials may be transported or what types of storage means may be employed. The various types of activated earths which are suitable or rather most suitable for oil filtration purposes are really more sensitive to taking on moisture than some of the fibrous materials. Therefore it is likewise quite necessary to dehydrate these activated earths, namely fuller's earth of different types, diatamaceous earths, bauxite and the like, before using them for filtering oil. In preparing the filtering medium of my invention, the materials are dehydrated to zero free moisture content (0 free moisture content) before they are used or combined to form the filtering medium and also before they are wetted with a light bodied, light colored, high quality mineral oil. This dehydrating of both the fibrous materials and the activated earths is a part of the process of the preparation of the oil-wetted materials either if used separately or in combination. The reason for oil-wetting any of the finely ground activated earths immediately after they are ground and dehydrated by the manufacturer is for the purpose of keeping them free of free moisture from the time they are manufactured until they are actually used regardless of the interval of time between their manufacture and consumption. This same thing applies to the fibrous materials, especially, for use in filtering lubricating oils.

The fibrous material in loose form is treated with the light-bodied and light-colored, high quality mineral oil by which the fibrous material becomes impervious to free moisture. When filtering clay or any of the several activated earths suitable for filtering oil is employed as part of the filtering medium of my invention, I finely divide the filtering clay and thereafter treat the divided filtering clay with light-bodied, light-colored, high quality mineral oil. The fibrous material and/or the filtering clay after having been treated with the mineral oil is permitted to drain for allowing the excess oil to be separated therefrom. When I employ the fibrous material and the filtering clay in combination I mix the fibrous material and filtering clay either before or after the oil treatment in proportions where the fibrous material greatly exceeds by both weight and volume the proportion of the filtering clay. I have found a proportion of three-fourths fibrous material and one-fourth filtering clay, by weight, to produce an excellent filtering medium.

The type of oil with which the materials are processed in a light-bodied, (that is the oil has a low viscosity of about 100 seconds at 100 degrees F.) light in color (about 15 to 18 Robinson color) and having as high a flash point as possble. An oil with the above characteristics is an oil of very high quality and one which would not tend to lower the quality of any other average type motor oil or lubricating oil when in process of being filtered on most any type of mechanical equipment. Also another very desirable feature in this oil-wetted type filtering medium is the fact that when a filter is first started into service with the wetted-type medium the oil immediately begins to seep through every fraction of an inch of its surface area whereas, when using the dry-type medium, invariably the filter is in service for many hours before the medium becomes entirely wetted and affords uniform seepage throughout its entire surface area. It is also my opinion from close observation that dry spots in this type of medium cause channeling of same, which of course immediately permits unfiltered oil to pass through to the center outlet tube or duct and contaminate the entire volume of oil in the system.

After the fibrous material and/or filtering clay and/or the mixture thereof have been treated by the light-bodied, light-colored, high quality mineral oil for reducing any deliquescent properties of the materials and rendering the materials impervious to moisture and after the excess oil is drained therefrom, I subject the oil treated material to a compressing operation on a filter supporting surface. The filter supporting surface which I employ is a strip of metallic screening. The metallic screening provides a base or support for the filtering medium. The paste like substance constituting the filtering medium is spread upon the strip of metallic screen and is pressed thereon to insure intimate engagement between the filtering medium and the metallic screening. The filtering medium united with the supporting screen strip is now ready to be coiled or rolled into position on the supporting spool.

The supporting spool is an especially prepared device having a tubular central portion and a pair of end flanges between which the screen strip carrying the filtering medium is wound. The central tubular portion of the spool is perforated and the perforated portion surrounded by a fine mesh screen such as 380 mesh screen adequate to allow the passage of oil or to prevent the passage of fine particles of filtering clay or fibrous material. The screen in rolled form on the spool provides means in various layers through the filtering unit for maintaining the filtering medium in proper position and also maintaining the porosity of the filtering medium for the passage of oil. The rolled filter unit is inserted within a filter casing of various forms and constructions and interposed in the path of the oil to be filtered. The filter unit effectively removes dirt, metallic particles, and other residue accumulated in a lubricant which tends to impair the operation of the filter. The filter units may be readily replaced when renewals are required as the structure of the device of my invention is very inexpensive in production.

Referring to the drawings in detail the spool constituting the support for the filter medium has end flanges 1 and tubular member 2 extending between the end flanges. Adjacent the connection of the tubular member 2 with the end flanges 1, I provide annular shoulders 3. The annular shoulders 3 are located intermediate the end flange 1 and the central tubular member 2. Perforations or apertures 4 are provided along the length of the central tubular member 2. A non-corrosive metallic screen of extremely fine mesh is rolled in the shape of a screen like tubular member 5 and supported between the shoulders 3 of the tubular support. The metallic screen may be spot welded or otherwise secured to the shoulder 3 of the tubular support. I have found that a 380 mesh screen formed from Monel metal is a highly desirable material from which to form the screen like tubular member. The screen like tubular member 5 is spaced away from the perforated central tube 2 and allows passage of the filtered oil through the screen like tubular member and through the perforations in the central tubular member while obstructing the passage of dirt, foreign matter, metallic particles and substances tending to impair the lubricating properties of the oil.

The filtering medium employed in the filter of my invention is shown at 7, spread in a paste like layer on the screen strip 6 which is rolled in position upon the spool like frame support. The end of the screen like strip 6 is spot welded or otherwise secured to the end flanges 1 of the spool like frame support.

The filtering medium of my invention is prepared as hereinbefore set forth by treating fibrous material such as mineral or rock wool, silk, cotton, asbestos fibre and the like and/or finely divided filtering clay such as fuller's earth, diatomaceous earth and bauxite which may be termed "activated" earths, or mixtures of the said fibrous material and filtering clay, with a light-bodied, light-colored, high quality mineral oil. The quantities of the fibrous material and the filtering clay are selected so that the fibrous material dominates by weight the quantity of filtering clay employed. The mineral oil employed for wetting the fibrous material and/or the filtering clay is allowed to drain, and thereafter the paste like filtering medium is spread and pressed in position upon the screen strip 6. The layer of filtering medium shown at 7, supported by the screen like strip 6, is then rolled, coiled, or wound upon the spool like frame support so that a plurality of superimposed layers of the filtering medium are supported by the spool like frame support as illustrated in Figs. 2, 3, 4, 7, 8, 12, 13 and 14. The spool like support with the filtering medium wrapped thereon constitutes a filter unit which is insertable into an enclosing container of various constructions. That is, the enclosing container may be shaped to meet the requirements of automotive lubrication, industrial lubrication or oil burner service and in other instances where oil must be filtered. In Fig. 3 of the drawings, I have shown the filter unit of my invention as applied to an automobile type filter in which the filter unit is mounted in the enclosing container 10. An outlet pipe connection 11 is provided for container 10 extending into the tubular upwardly extending outlet pipe 9 having the flanged end 9a thereon. A gasket 8 is seated on the flanged end 9a of the tubular support and outlet pipe 9 and provides a seat for the lower recessed end of the filter unit. The upper recessed end of the filter unit is centered by means of a downwardly projecting central tubular member 22 integrally connected with the top closure 17 for the container. The top closure 17 is shaped to fit over container 10 and to be supported by the flat peripheral flange 16 thereon with an annular shoulder 18 depending from top closure 17 and extending within container 10. A gasket 19 is provided for sealing the joint between the periphery of top closure 17 and the peripheral flange 16 on container 10. Bolts 20 extend through top closure 17 and through gasket 19 and peripheral flange 16 and are secured by washer and nut connections 21 beneath the peripheral flange 16. Depending upon whether or not the discharge connection is provided adjacent the top or the bottom of the filter container, I provide a removable plug 23 adapted to be screw threaded into the central tube 22. Plug 23 closes top 22 so that the discharge connection is taken through tubular support 9. The discharge connection is shown extending from outlet pipe connection 11 through coupling 12 to the outlet pipe 14 of the oil system. A removable plug 15 is provided in the base of container 10 for draining sediment from the container from time to time. The oil inlet is indicated at 24 in the top closure 17. The oil enters oil inlet pipe 24 and seeps in a radial direction through the superimposed layers of filtering medium constituted by the wrapped paste like layers of filtering medium supported on the spool like frame. The fact that the filtering medium is divided into layers with spaced layers of screen like material 6 therebetween insures against breakdown of the filtering medium for developing crevices or channels through which oil might tend to pass instead of seeping through the filtering medium. Any crevices or channels which tend to develop are self-sealing between the spaced layers of screen like material by which the paste like filtering medium is supported. Detrimental effects of moisture on the filtering medium are substantially nil inasmuch as the fibrous material and filtering clay are protected by a film of moisture resisting oil as a result of initial oil treatment to which the filtering medium is subjected.

The filter unit may be removed from time to time by removing closure 17, withdrawing the used filter unit and inserting a fresh filter unit.

In certain oil systems greater oil filtering capacity is necessary whereupon I employ an enlarged casing 10 as illustrated in Fig. 7 and arrange the filter units in cascade or in superimposed relation one above another. In this arrangement the filter units are mounted end to end with a coupling tube 25 therebetween. The coupling tube 25 is seated against gaskets 8 mounted in the upper recess of the lower filter unit and the lower recess of the upper filter unit and serves to establish a continuous passage for oil through the central tubular member 2. The tubular recess of the tubular filter unit is arranged to receive a coupling tube 26 which seats against gasket 8, retained in the upper recess of the upper filter unit and against the gasket 8 seated in the central depending tube 22 in top closure 17. In this arrangement the lower tubular support 9 and the coupling tubes 25 and 26 are so dimensioned that the two filter units may be properly assembled in superimposed relation. However, there are instances in which inaccuracies may result in a loose fit of the superimposed filter units in which event I provide adjacent the closed end of the filter units an adjusting screw as illustrated for example in Fig. 14.

The end of the filter which is to be maintained normally closed has the end of the adjacent filter unit plugged by a disc like member 39 which seats against gasket 8 and provides a bearing against which the adjusting screw 40 bears. The adjusting screw 40 has the end 41 thereof in contact with disc 39. The end 41 is forced against disc 39 by applying a tool to the tool engaging head 42 by which the entire column of the filter units may be tightened in a rigidly erect position. As heretofore pointed out the adjusting screw may be mounted in the tubular support and outlet pipe 9 if the discharge end of the filter is to be taken from the top of the filter. In this instance the screw 40 is somewhat longer than the length of the screw required in the top closure 17. The same manner of sealing the end of the central oil passage is employed by utilizing a disc 39 seated against a gasket 8 retained in the recessed end of the filter unit. It will be understood that the adjusting screw structure may be employed in many of the forms of my invention which I have illustrated.

In automotive type filters it is often desirable to manufacture one type of filter which is extremely low in cost. In such instances I may seal a filter unit directly within the casing 10 in the manner illustrated in Fig. 10 where a cover 30 having a rolled over annular skirt 31 is engaged beneath the periphery of beaded edge 27 of the container 10. The beaded edge 27 of container 10 may have an annular recess 28 therein for receiving a resilient gasket 29 which serves to provide a substantially hermetic seal between the cover 30 and the container 10. The filter is installed in the lubricating system of an automobile and when the filtering efficiency thereof has become impaired the entire casing with the filter unit therein may be removed and replaced by an entirely new casing with a filter unit contained therein.

In applying my invention to industrial installations I find that slight changes in form of assembly of the filter becomes necessary. In Figs. 11 and 12 I have shown one industrial type filter in which a casing 32 which is substantially a complementary counterpart of casing 10 is employed. That is, casing 32 is inverted in position with respect to casing 10. Casing 32 has an annular flange 33 thereon which is substantially aligned with annular flange 16 of casing 10 with gasket 19 disposed therebetween. Bolts 20 extend through the annular flange 33, gasket 19 and flange 16 and are secured by bolt and nut connections 20—21. The inlet for oil in casing 32 is indicated at 34. The tubular member which provides both a support and which may provide a passage for oil for the oil filter units is shown in Fig. 12 at 35 depending from the end of casing 32. Plug 36 serves to close the end of tubular member 35 if the discharge end of the filter is to be located at the bottom of the filter. Tubular member 35 is provided with flange 35a which seats against gasket 8 in the recessed end of the upper filter unit for assembling the filter units within the casing and maintaining the position thereof. The coupling tube 25 heretofore described in connection with Fig. 7 serves to interconnect the upper and lower filter units, when the filter units are assembled as shown in Fig. 12.

In other industrial installations it is necessary to further increase the capacity of the oil filter. Under these circumstances I employ a construction as illustrated in Fig. 13 wherein casing 10 is lengthened and the complementary counterpart thereof indicated at 32 also lengthened to provide closure means for at least two filter units constructed in accordance with my invention. The filter units are assembled in superimposed relation with coupling tubes 37, 25 and 38 arranged in suitable relation to gaskets 8 and disposed in adjacent recesses formed in the ends of the filter units. The coupling tubes serve to maintain the alignment of the longitudinally extending oil passages through the several filter units. Proper tensioning means of the kind such as illustrated in Fig. 14 may be employed in maintaining the alignment of the filter units.

The manner of preparing the filtering medium of my invention insures against detrimental effects of moisture which heretofore has been a serious defect in the operation of oil filters. The arrangement of oil filter units as set forth herein is highly practical in that each unit provides a radially inward path for the seepage of used oil allowing dirt, foreign matter, metallic particles and other accumulated matter to be removed from the oil and the oil delivered to the central discharge duct. As pointed out, inlet and discharge connections may be at the same end of the filter casing or at opposite ends in accordance with the most convenient installation arrangement for the filter.

While I have described my invention in certain of its preferred embodiments, I realize that modifications may be made and I desire that it be understood that no limitations upon my invention are intended other than may be imposed by the scope of the appended claims.

What I claim as new and desire to secure by Letters Patent of the United States is as follows:

1. A filter unit for oil comprising a spool like frame having a pair of end flanges interconnected by a central tubular member, said central tubular member being perforated for the passage of oil therethrough, a filter screen mounted concentrically about the perforated central tubular member, a screen like supporting strip having a paste like filtering medium spread thereon and consisting of a mixture of fibrous material and finely divided clay wetted by a light-bodied oil, said screen like strip with the paste like filtering medium thereon being spirally wrapped about said filter screen for providing a plurality of superimposed layers of filtering medium on said filter unit, said paste like medium penetrating the meshes of said screen like strip and uniting adjacent layers of said medium to provide a substantially homogeneous filtering mass over said filter screen.

2. A filter unit comprising a spool like frame support having a pair of end flanges interconnected by a central tubular member, said central tubular member having an annular shoulder formed thereon adjacent the inner faces of each of said end flanges adapted to receive supporting fluid conduits, and said central tubular member being perforated for the passage of fluid therethrough, a tubular screen like member supported between the annular shoulders on said central tubular member, a filtering medium spread in paste like form upon a flexible screen like strip and spirally wound around said tubular screen like member and providing a multiplicity of superimposed layers of filtering medium for fluid passing radially inwardly to said central tubular member.

3. A filter comprising a casing, a plurality of filter units adapted to be disposed in superimposed relation within said casing, each of said filter units having a passage extending longitudinally therethrough and each of said units being recessed adjacent the said passage on opposite ends of each unit, coupling members extending between the recessed portions of adjacent filter units, and means extending into the recessed portions of the filter units on the extreme opposite ends of the superimposed series of filter units for supporting said series of units and maintaining the passages in said filter units in axial alignment.

4. A filter comprising a casing, an inlet connection for said casing, a central discharge connection in one end of said casing, a tubular member projecting interiorly of said casing from said central discharge connection, a flanged end on said tubular member, a multiplicity of filter units each having longitudinally extending passages therethrough and each being recessed at the opposite ends thereof, the recessed end of one of said filter units being removably seated on the flanged end of said tubular member with the passage in the last mentioned filter unit aligned with the discharge connection, means for aligning the passages in the other filter units with the passage in the last mentioned filter unit, and means for closing the opposite end of said aligned passages and clamping said units in position.

5. A filter comprising a casing, a multiplicity of filter units adapted to be mounted in superimposed relation within said casing, a passage extending centrally through each of said filter units, means for axially aligning the passages of said filter units within said casing for providing a discharge duct, a discharge connection aligned with said discharge duct, an inlet connection for said casing whereby fluid to be filtered is directed radially inwardly through each of said filter units and delivered to said discharge duct, means for closing the end of said discharge duct opposite the discharge end thereof, and means bearing on said closing means for adjustably tensioning the interfitting relationship of the said superimposed oil filter units for maintaining said units in position.

6. A filter unit for oil comprising a spool-like carrier having a perforated central tubular member, a fine mesh retaining screen carried by said perforated tubular member, a filtering medium carried by said spool-like carrier comprising a mixture of fibrous material and finely divided clay, said screen being adapted to retain said clay and said fibrous material, said filtering medium being wetted with a light-bodied oil, and a screen-like strip spirally disposed in said filtering medium about said tubular member for supporting said filtering medium in a tightly packed arrangement, the wetted condition of said filtering medium aiding it to unite through the meshes of said screen like strip, preserving it from deterioration prior to use and rendering it immediately penetrable by the oil to be filtered.

ROBERT H. PENNEBAKER.